(12) United States Patent
Miyoshi (10) Patent No.: US 7,628,553 B2
(45) Date of Patent: Dec. 8, 2009

(54) IMAGE PICKUP APPARATUS WITH LENS BARRIER DEVICE

(75) Inventor: Kaori Miyoshi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 11/675,208

(22) Filed: Feb. 15, 2007

(65) Prior Publication Data

US 2007/0196102 A1    Aug. 23, 2007

(30) Foreign Application Priority Data

Feb. 17, 2006    (JP)    ............................. 2006-041187

(51) Int. Cl.
  *G03B 17/00*    (2006.01)
  *G03B 17/04*    (2006.01)
(52) U.S. Cl. ..................... 396/448; 396/348; 396/349
(58) Field of Classification Search ................ 396/448, 396/348–349
  See application file for complete search history.

(56) References Cited

U.S. PATENT DOCUMENTS 6,419,407 B1 * 7/2002 Nakazawa .................. 396/448
2001/0024573 A1 * 9/2001 Nomura et al. ............. 396/448
2004/0081448 A1 * 4/2004 Suzuki ....................... 396/448
2005/0135799 A1 * 6/2005 Tanaka et al. ............... 396/448

FOREIGN PATENT DOCUMENTS

JP    U 03-018519    2/1991

* cited by examiner

*Primary Examiner*—Melissa J. Koval
*Assistant Examiner*—Leon W Rhodes
(74) *Attorney, Agent, or Firm*—Canon U.S.A. Inc., I.P. Division (57) ABSTRACT

An image pickup apparatus in which the movement of a barrier blade in a direction toward the lens surface caused by external force can be limited without increasing the strength of the barrier blade. The apparatus comprises a barrier blade which is movable between a closing position at which the barrier blade closes a light entrance aperture of an image pickup lens and an opening position at which the barrier blade opens the light entrance aperture, and a drive member which drives the barrier blade. The drive member includes a supporting portion which limits the movement of the barrier blade toward a lens surface side, and the supporting portion is located outside the light entrance aperture when the barrier blade is at the opening position and located inside the light entrance aperture when the barrier blade is at the closing position.

5 Claims, 11 Drawing Sheets

PRIOR ART

IMAGE PICKUP APPARATUS WITH LENS BARRIER DEVICE

BACKGROUND OF THE INVENTION

The present invention relates to an image pickup apparatus having a lens barrier for protecting an image pickup lens.

An open/closable lens barrier is ordinarily provided on a front end portion of an image pickup lens in an image pickup apparatus such as a compact digital still camera for the purpose of preventing dust or a contaminant from being attached to the lens surface or preventing the lens surface from being damaged.

Figure 11:
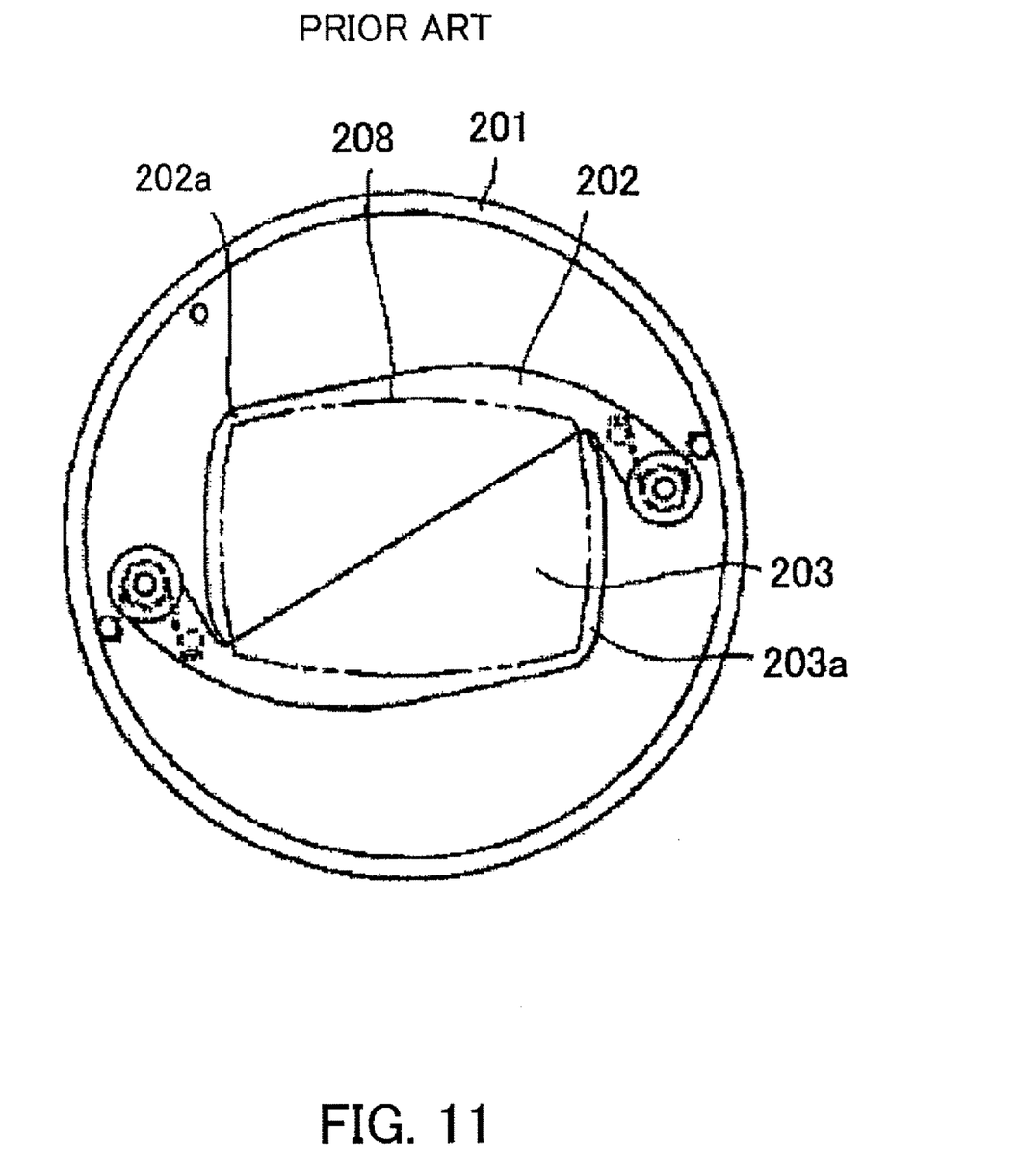
FIG. 11 is a front view of a conventional lens barrier in a closed state.
Figure 12:
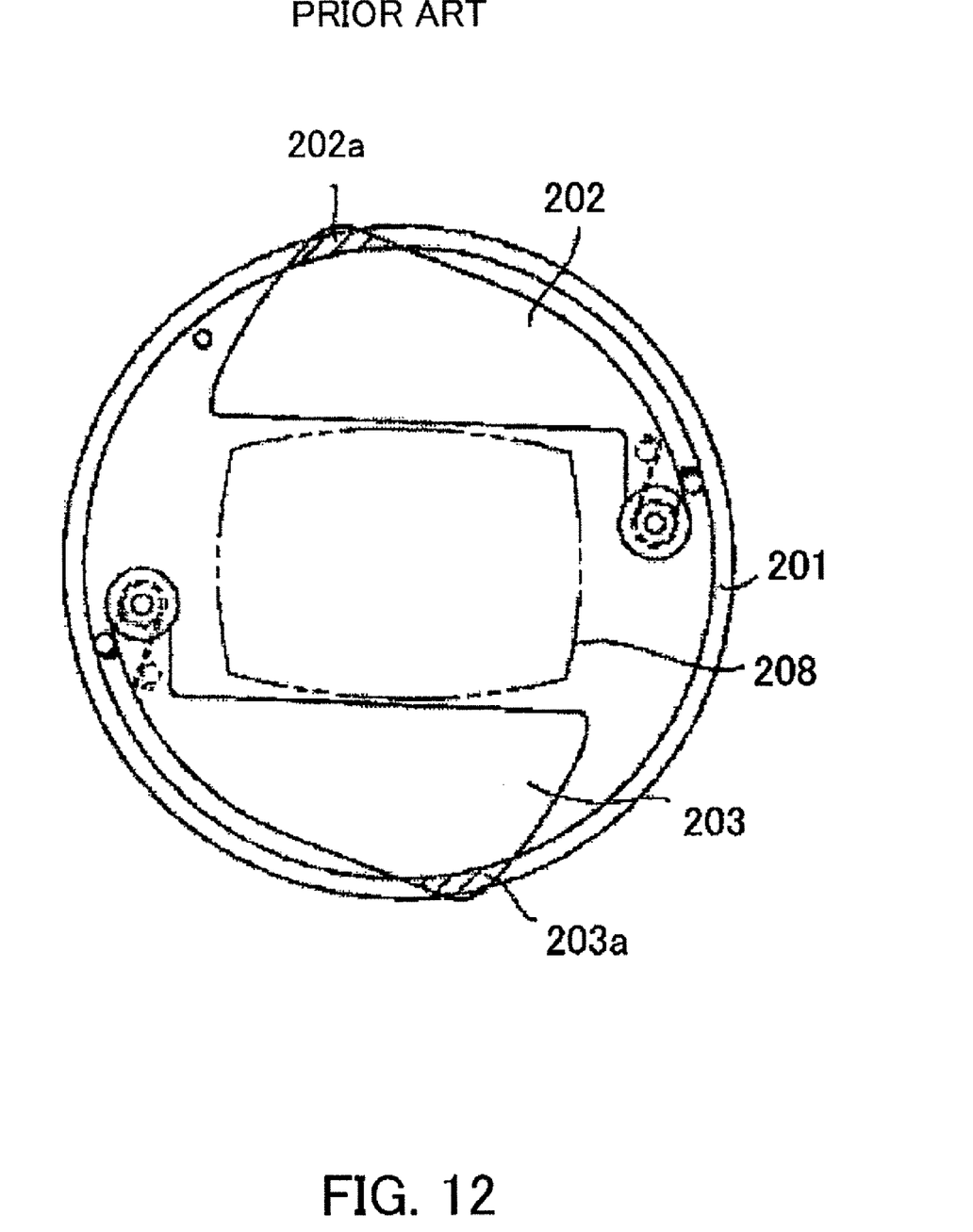
FIG. 12 is a front view of the conventional lens barrier in an opened state.

FIGS. 11 and 12 show a conventional lens barrier. FIG. 11 shows a state in which the lens barrier is closed. FIG. 12 shows a state in which the lens barrier is opened.

In FIGS. 11 and 12, reference numeral 201 denotes a lens barrel, reference numeral 208 denotes a light entrance aperture of the lens barrel, and reference numerals 202 and 203 denote barrier blades which are turned about shaft portions provided at their one ends between a closing position at which they close the light entrance aperture 208 and an opening position at which they open the light entrance aperture 208.

There is a demand for reducing the outer diameter of the lens barrel 201 with the reduction in camera size. However, in the arrangement in which, as shown in FIG. 11, the light entrance aperture 208 is completely closed with the two barrier blades 202 and 203, there is a possibility of portions 202a and 203a (hatched portions) of the barrier blades 202 and 203 at the opening position projecting beyond the outer diametrical ends of the lens barrel 201. This is an impediment to the reduction in diameter of the lens barrel.

Japanese Utility Model Laid-Open No. 3-18519 discloses a lens barrier in which two sets of barrier blades are used, each set consisting of a pair of barrier blades of a small size capable of being overlapped with each other and being extended. The lens barrier can close a large-area light entrance aperture when it is in the extended state and retract to a position outside the light entrance aperture when it is in the overlapped state.

However, if the size of each barrier blade is reduced, the strength of the barrier blade is so small that there is a possibility of the barrier blade being moved (displaced or deformed) in a direction toward the lens surface by even a small external force. In this case, the moved barrier blade scratches the lens surface or makes the lens barrier unable to operate. If the thickness of the barrier blade is increased for the purpose of increasing the strength thereof, the entire length of the lens barrel is increased.

SUMMARY OF THE INVENTION

The present invention provides an image pickup apparatus in which the movement of each barrier blade in a direction toward the lens surface caused by external force can be limited without increasing the strength (thickness) of the barrier blade.

According to an aspect, the present invention provides an image pickup apparatus which comprises a barrier blade which is movable between a closing position at which the barrier blade closes a light entrance aperture of an image pickup lens and an opening position at which the barrier blade opens the light entrance aperture, and a drive member which drives the barrier blade. The drive member includes a supporting portion which limits the movement of the barrier blade toward a lens surface side, and the supporting portion is located outside the light entrance aperture when the barrier blade is at the opening position and located inside the light entrance aperture when the barrier blade is at the closing position.

Other objects and features of the present invention will be apparent from the following description of a preferred embodiment with reference to the accompanying drawings.

DETAILED DESCRIPTION OF THE PREFERRED EMBODIMENT

A preferred embodiment of the present invention will hereinafter be described with reference to the accompanying drawings.

Figure 10:
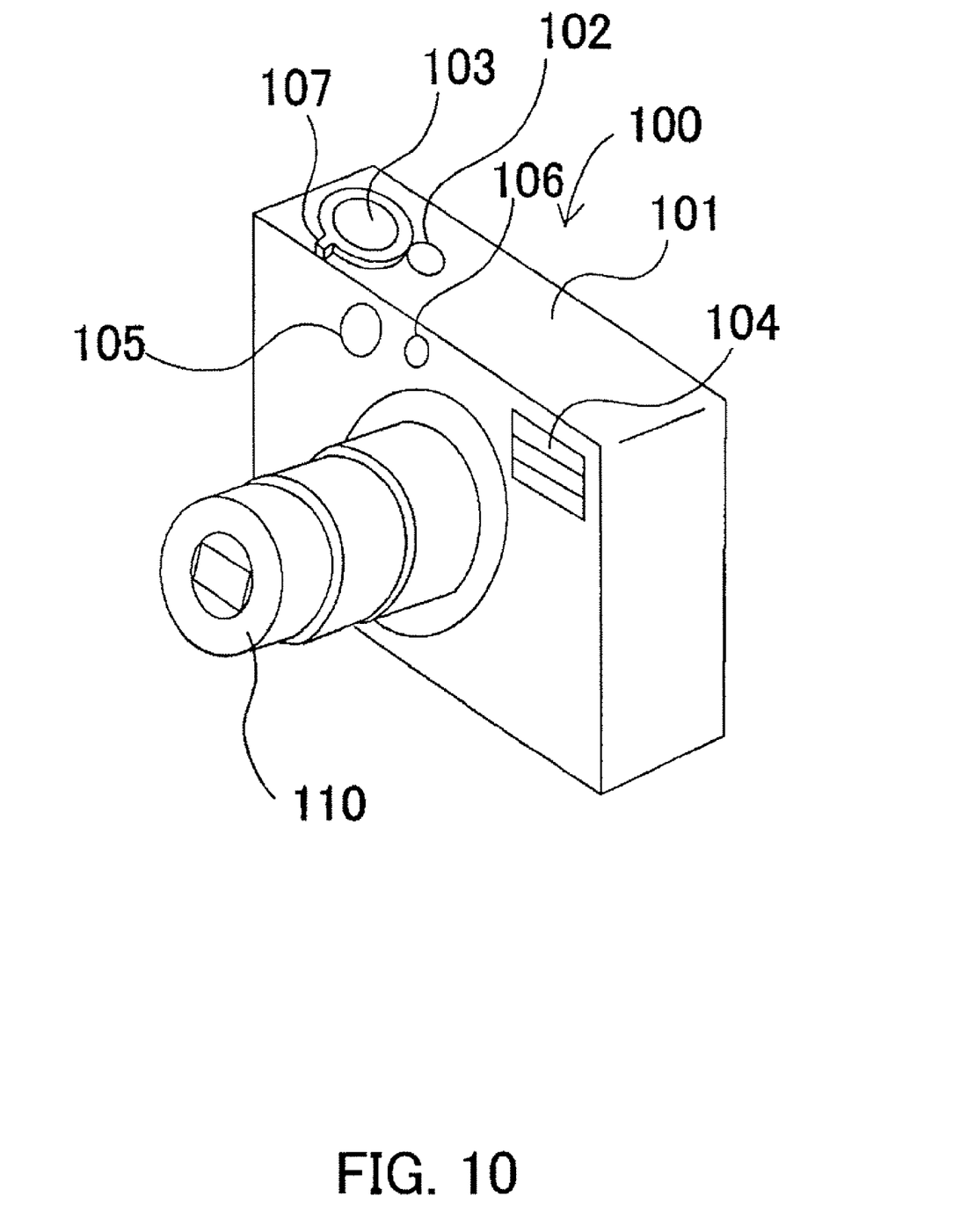
FIG. 10 is a diagram showing an external appearance of a camera incorporating the lens barrier according to the embodiment.

FIG. 10 shows an external appearance of a compact digital still camera which is an image pickup apparatus having a lens barrel (image pickup lens) that is an embodiment of the present invention.

In FIG. 10, reference numeral 100 denotes a camera, reference numeral 101 a camera body, reference numeral 102 a main switch of the camera, i.e., a switch for turning on/off a power supply, and reference numeral 103 an image pickup switch which is half-pressed to perform image pickup preparation such as photometry and auto focus (AF) operations, and which is fully pressed to perform image pickup and recording.

Reference numeral 104 denotes a flash lighting portion, reference numeral 105 an objective window of a finder, reference numeral 106 a light receiving window for photometry, reference numeral 110 a three-step-collapsible lens barrel, and reference numeral 107 a zoom lever. Zoom drive of the lens barrel 110 can be performed by turning the zoom lever 107. In the camera body 101, an image pickup element such as a CCD sensor or a CMOS sensor (not shown) for photoelectric conversion of an object image formed by the image pickup optical system in the lens barrel 110 is provided.

FIGS. 1 and 2 and 4 to 6 show the configuration of a lens barrier mechanism provided on a front end portion (an end portion on the object side) of the lens barrel 110.

A light flux passing through a barrier aperture 13a described below and also passing through lenses and a diaphragm to reach the image pickup element in the lens barrel of this embodiment is referred to as an "effective light flux". The barrier aperture 13a corresponds to the aperture plane of the light entrance aperture (or an opening through which the effective light flux enters the lens), and a space region through which the effective light flux passes from the aperture plane to the lens surface closest to the object corresponds to the light entrance aperture. Also, the side on which the image pickup element is placed and which is opposite from the object side is referred to as an "image side".

Figure 1:
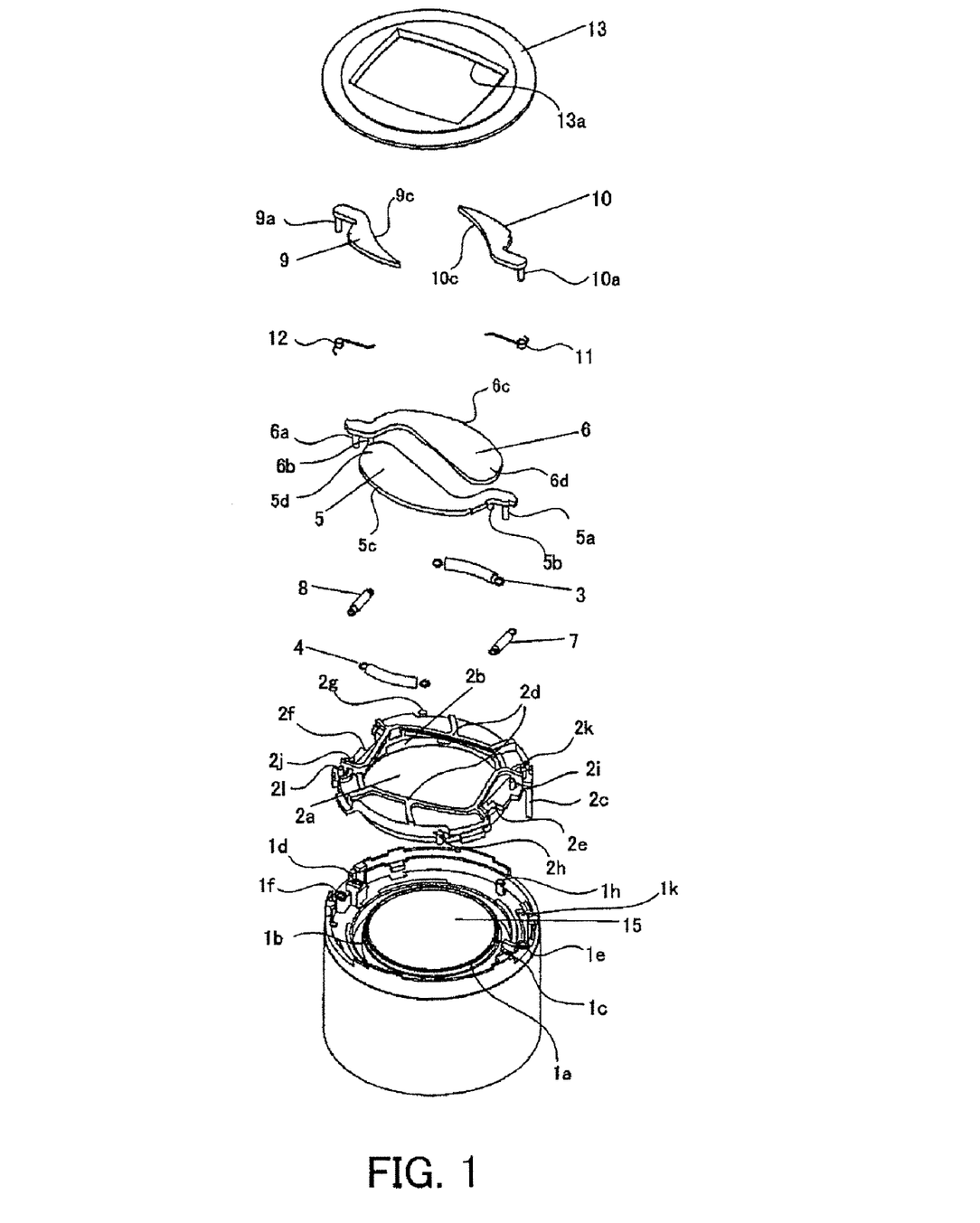
FIG. 1 is an exploded perspective view of a lens barrier that is an embodiment of the present invention.
Figure 2:
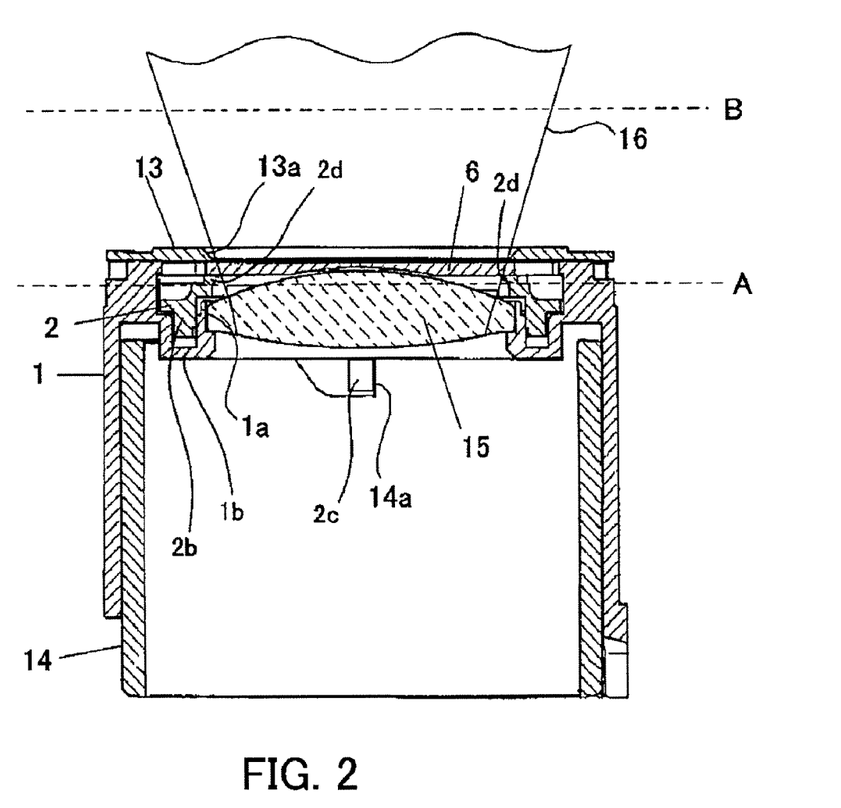
FIG. 2 is a sectional view of the lens barrier in the embodiment.
Figure 3A:
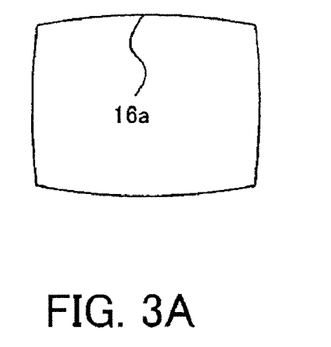
FIG. 3A is a sectional view of an effective light flux taken along line A in FIG. 2.
Figure 3B:
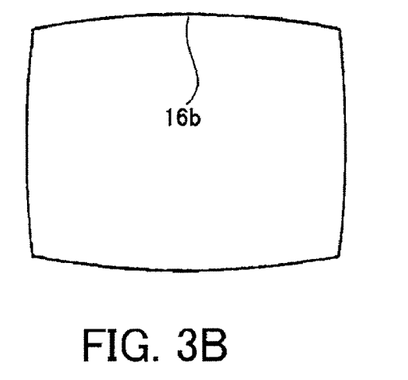
FIG. 3B is a sectional view of the effective light flux taken along line B in FIG. 2.

In FIG. 2, reference numeral 16 denotes the effective light flux. FIG. 3A shows a section of the light flux 16 (or light entrance aperture 16a) taken along line A in FIG. 2, and FIG. 3B shows a section 16b of the light flux taken along line B in FIG. 2. Since the image pickup element is rectangular, the effective light flux reaching the image pickup element also has a generally rectangular sectional shape. As is apparent from FIGS. 3A and 3B, the size (area) of the section of the effective light flux 16 changes with respect to the distance from the lens surface.

In FIGS. 1 and 2 and 4 to 6, reference numeral 1 denotes a barrel frame on which the lens barrier mechanism is mounted in the lens barrel. A cam barrel 14 is disposed inside the barrel frame 1. When the cam barrel 14 is rotated by a barrel drive mechanism (not shown) including a motor, the barrel frame 1 is moved along the optical axis direction by a cam (not shown) formed in the cam barrel 14.

The barrel frame 1 has a lens holding portion 1a formed at its center. A lens 15 closest to the object is held by the lens holding portion 1a.

The barrel frame 1 has a ring holding portion 1b formed on the periphery of the lens holding portion 1a. A barrier drive ring 2 described below is rotatably held by the ring holding portion 1b. A circular-arc hole 1k through which a follower arm 2c formed on the barrier drive ring 2 is extended is formed in the barrel frame 1 outside the ring holding portion 1b.

The barrel frame 1 (on the periphery of the ring holding portion 1b) is provided with hole portions 1c, 1d, 1f and 1e for holding a pair of first barrier blades 5 and 6 and a pair of second barrier blades 9 and 10 and hooks 1h and 1i on which ends of opening springs 3 and 4 are hooked. The first barrier blades 5 and 6 close and open a large region (first region) including the optical axis in the light entrance aperture. The second barrier blades 9 and 10 close and open a small region (second region) outside the larger region in the light entrance aperture.

Reference numeral 2 denotes a barrier drive ring in which an opening 2a is formed at its center. The barrier drive ring 2 is rotated about the optical axis of the lens in a reciprocating manner to perform opening/closing drive of the first barrier blades 5 and 6. The barrier drive ring 2 has a held portion 2b formed on the outer periphery of its image side part and is rotatably held at the held portion 2b by the ring holding portion 1b of the barrel frame 1.

The follower arm 2c extending on the image side is formed on the barrier drive ring 2. The follower arm 2c extends to the cam barrel 14 through the circular-arc hole 1k of the barrel frame 1. In the state shown in FIG. 2, the follower arm 2c contacts an inner end surface of a cam follower groove 14a formed in the cam barrel 14. The cam barrel 14 is rotated from this state to enable reciprocating rotation of the barrier drive ring 2.

The other ends of the opening springs 3 and 4 are hooked on hooks 2g and 2h formed on outer peripheral portion of the barrier drive ring 2. The barrier drive ring 2 is thereby biased constantly clockwise (opening direction) as viewed in FIG. 4.

Blade drive portions 2e and 2f are provided in outermost peripheral portions of the barrier drive ring 2. The blade drive portions 2e and 2f can contact projection portions 5b and 6b provided on the first barrier blades 5 and 6 in the circumferential direction. The rotation of the barrier drive ring 2 causes the blade drive portions 2e and 2f to press the projection portions 5b and 6b, thereby performing opening/closing drive of the first barrier blades 5 and 6.

Around the opening portion 2a of the barrier drive ring 2 is provided barrier rail portions (supporting portions) 2d for guiding the first barrier blades 5 and 6 and the second barrier blades 9 and 10 which turn in the opening/closing direction on their image side (lower side as viewed in FIG. 2) in a sliding manner. The barrier rail portions 2d also have the role of limiting the movements of the first barrier blades 5 and 6 and the second barrier blades 9 and 10 toward the image side. "Limiting the movement toward the image side" means preventing the movement toward the image side exceeding a predetermined amount (e.g., an amount corresponding to a gap provided between the barrier rail portions 2d and the barrier blades to enable the barrier blades to turn) while allowing the movement within the predetermined amount.

The first barrier blade 5 has a shaft portion 5a extending toward the image side. The shaft portion 5a is inserted in the hole 1c formed in the barrel frame 1 to enable the first barrier blade 5 to turn about the shaft portion 5a. One end of a closing spring 7 described below is hooked on the projection portion 5b extending toward the image side. The other end of the closing spring 7 is hooked on a projection portion 2i provided on the barrier drive ring 2. Therefore the closing spring 7 constantly biases the first barrier blade 5 clockwise (in the closing direction) about the shaft portion 5a.

The projection portion 5b provided on the image side surface of the first barrier blade 5 can contact the blade drive portion 2e provided on the barrier drive ring 2. The clockwise rotation of the barrier drive ring 2 from the closing state shown in FIG. 4 causes the blade drive portion 2e to press the projection portion 5b. The first barrier blade 5 is thereby driven counterclockwise (in the opening direction) about the shaft portion 5a to turn to an opening position shown in FIG. 5.

Figure 4:
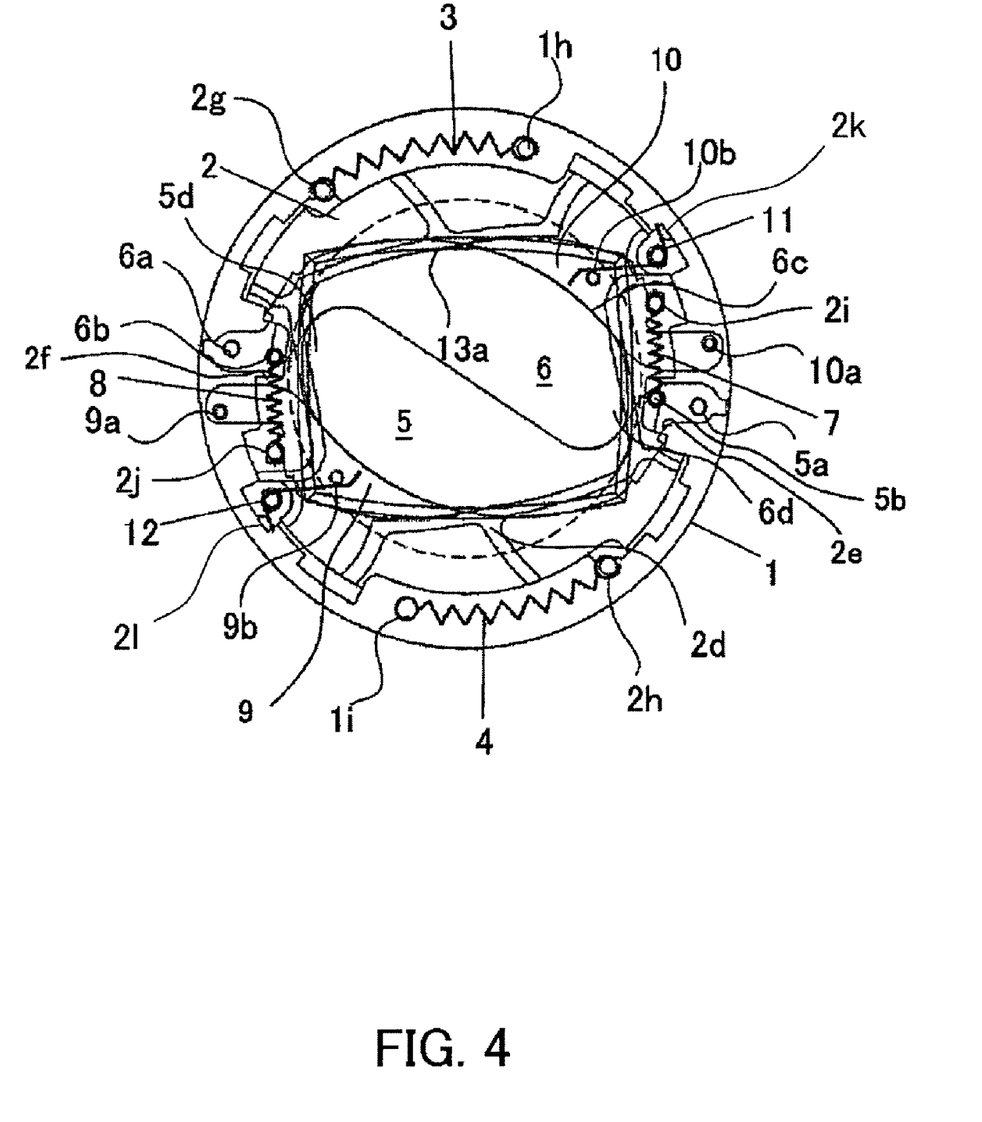
FIG. 4 is a front view of a closed state of the lens barrier in the embodiment.
Figure 5:
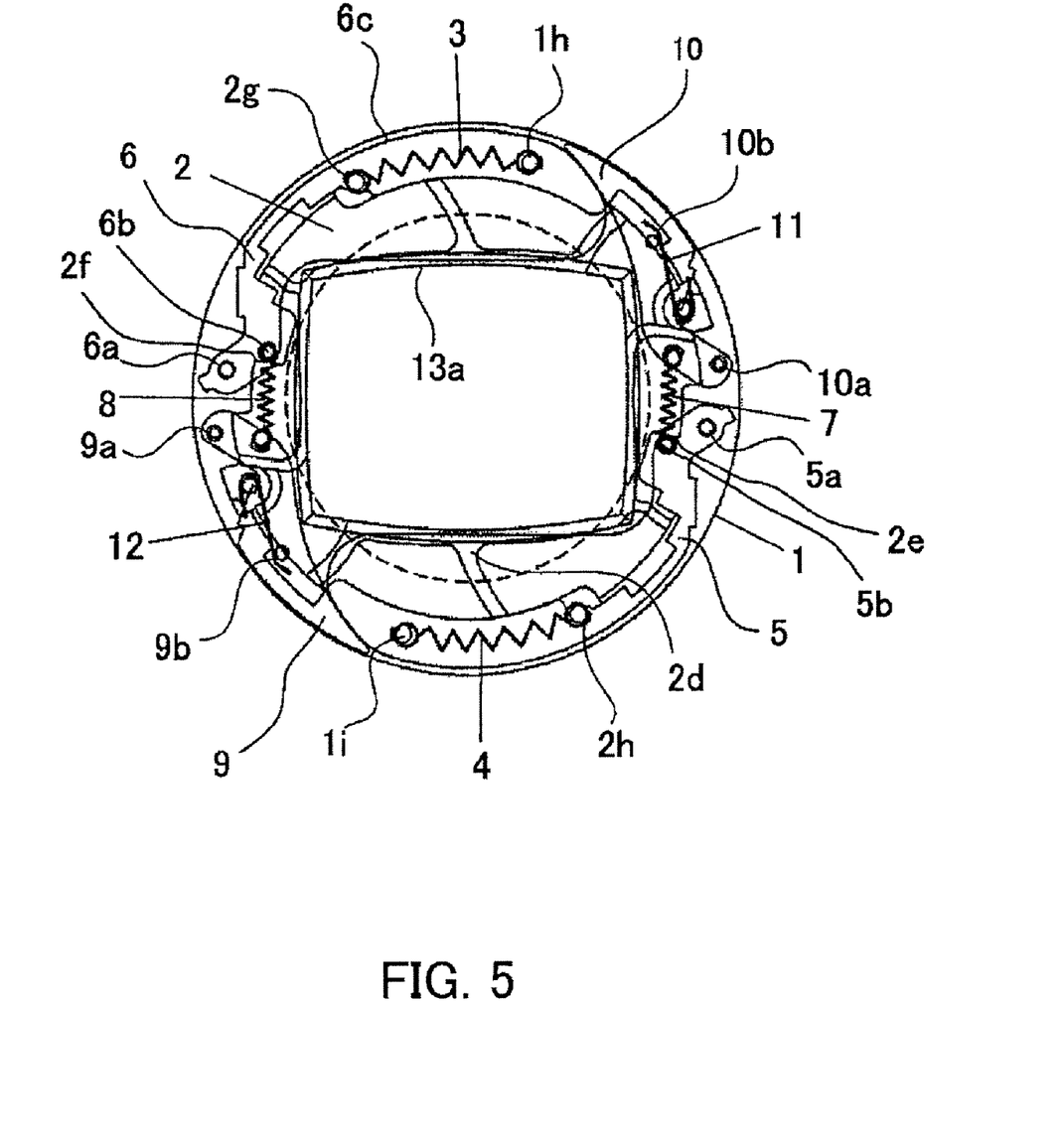
FIG. 5 is a front view of a closed state of the lens barrier in the embodiment.
Figure 6:
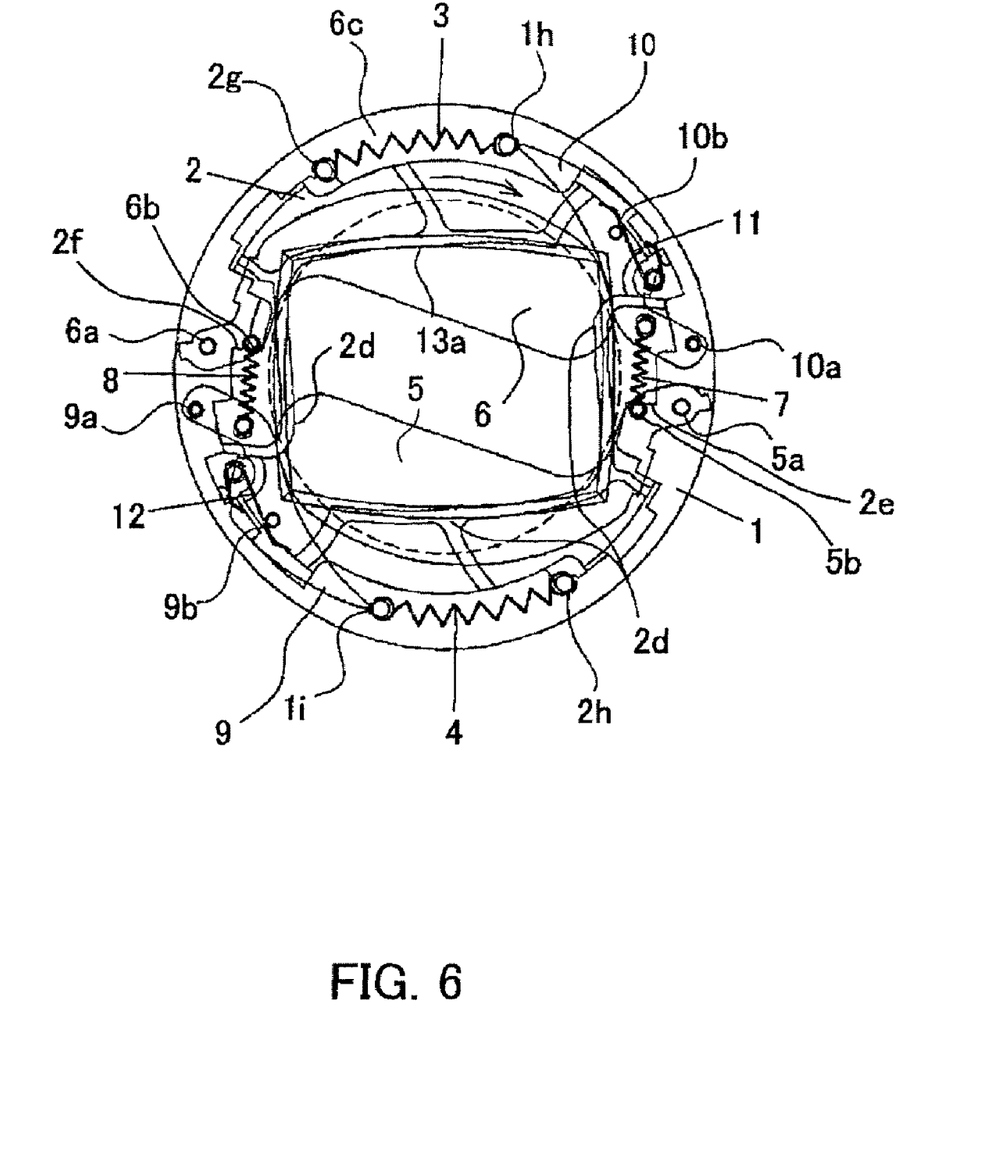
FIG. 6 is a front view of an intermediate state between the opened and closed states of the lens barrier in the embodiment.

When the barrier drive ring 2 is rotated counterclockwise from the state shown in FIG. 5, the biasing force of the closing spring 7 causes the projection portion 5b to move by following the blade drive portion 2e. The first barrier blade 5 is thereby turned clockwise about the shaft portion 5a to a closing position shown in FIG. 4. FIG. 6 shows an intermediate drive state from the closing position shown in FIG. 4 to the opening position shown in FIG. 5.

The first barrier blade 6 has the same shape as that of the first barrier blade 5. The first barrier blade 6 has a shaft portion 6a extending toward the image side. The shaft portion 6a is inserted in the hole 1d formed in the barrel frame 1 to enable the first barrier blade 6 to turn about the shaft portion 6a. One end of a closing spring 8 described below is hooked on the projection portion 6b projecting toward the image side. The other end of the closing spring 8 is hooked on a projection portion 2j provided on the barrier drive ring 2. Therefore the closing spring 8 constantly biases the first barrier blade 6 clockwise (in the closing direction) about the shaft portion 6a.

The projection portion 6b provided on the image side surface of the first barrier blade 6 can contact the blade drive portion 2f provided on the barrier drive ring 2. The clockwise rotation of the barrier drive ring 2 from the closing state shown in FIG. 4 causes the blade drive portion 2f to press the projection portion 6b. The first barrier blade 6 is thereby driven counterclockwise (in the opening direction) about the shaft portion 6a to turn to the opening position shown in FIG. 5. When the barrier drive ring 2 is rotated counterclockwise from the state shown in FIG. 5, the biasing force of the closing spring 8 causes the projection portion 6b to move by following the blade drive portion 2f. The first barrier blade 6 is thereby turned clockwise about the shaft portion 6a to the closing position shown in FIG. 4.

When the two first barrier blades 5 and 6 turn to the position shown in FIG. 4, they contact each other to stop moving.

Even if the barrier drive ring 2 is rotated counterclockwise from the closing state, the closing springs 7 and 8 are charged to enable the first barrier blades 5 and 6 to be maintained in the position shown in FIG. 4.

The second barrier blades 9 and 10 are placed in the peripheral region outside the region where the first barrier blades 5 and 6 are placed, as shown in FIG. 4, and are turned in the peripheral region for opening/closing operation.

The second barrier blade 9 has a shaft portion 9a projecting toward the image side. The shaft portion 9a is inserted in the hole if formed in the barrel frame 1 to enable the second barrier blade 9 to turn about the shaft portion 9a. One end of a torsion spring 12 is hooked on the projection portion 9b projecting toward the image side. The other end of the torsion spring 12 is hooked on the projection portion 21 provided on the barrier drive ring 2. The second barrier blade 9 is thereby biased constantly counterclockwise (in the closing direction) about the shaft portion 9a. The second barrier blade 9 is thereby turned in a state of being interlocked with the turn of the first barrier blade 5 while constantly maintaining an inner peripheral surface 9c of the second barrier blade 9 in contact with an outer peripheral surface 5c of the first barrier blade 5.

Similarly, the second barrier blade 10 has a shaft portion 10a projecting toward the image side. The shaft portion 10a is inserted in the hole 1e formed in the barrel frame 1 to enable the second barrier blade 10 to turn about the shaft portion 10a. One end of a torsion spring 11 is hooked on the projection portion 10b projecting toward the image side. The other end of the torsion spring 11 is hooked on the projection portion 2k provided on the barrier drive ring 2. The second barrier blade 10 is thereby biased constantly counterclockwise (in the closing direction) about the shaft portion 10a. The second barrier blade 10 is thereby turned in a state of being interlocked with the turn of the first barrier blade 6 while constantly maintaining an inner peripheral surface 10c of the second barrier blade 10 in contact with an outer peripheral surface 6c of the first barrier blade 6.

Thus, the closed state in which the barrier aperture 13a described below is closed with the above-described four barrier blades, i.e., the two first barrier blades 5 and 6 and the two second barrier blades 9 and 10, and an opened state in which the blades are retracted to a place outside the barrier aperture 13a are produced.

Reference numeral 13 denotes a barrier cover. The barrier aperture 13a generally rectangular is formed in the barrier cover 13 at its center. The barrier cover 13 is placed at the foremost end of the lens barrel. The barrier cover 13 has the role of guiding the first barrier blades 5 and 6 and the second barrier blades 9 and 10 in a sliding manner and the role of limiting the movements of the blades toward the object side (in the direction toward the top as viewed in FIG. 2).

Next, the relationship between the lens barrier configured as described above and the operation of the camera will be described.

When the lens barrier is closed as shown in FIG. 4, the lens barrel 110 is collapsed (retracted) in the camera body 101 shown in FIG. 10. When the main switch 102 is turned on in this state, the barrel drive mechanism (not shown) performs an operation to project out the lens barrel 110. The barrel frame 1 holding the lens barrier is moved frontward to the outermost position on the object side by the rotation of the cam barrel 14.

At this time, the cam barrel 14 moves away from the barrel frame 1 toward the image side while being rotated in a rightward direction as viewed in FIG. 2 (the clockwise direction as viewed in FIGS. 4 to 6, this direction of rotation as viewed in FIG. 2 being also expressed by "clockwise" in the following description).

The barrier drive ring 2 biased clockwise by the opening springs 3 and 4 is rotated clockwise by causing the follower arm 2c to follow the rotation of the follower groove 14a of the cam barrel 14 and then moving away from the follower groove 14a. The clockwise rotation of the barrier drive ring 2 causes the blade drive portions 2e and 2f to press the projection portions 5b and 6b. The first barrier blades 5 and 6 are thereby driven in the opening direction to turn to the opening position shown in FIG. 5. With the opening operation of the first barrier blades 5 and 6, the second barrier blades 9 and 10 also are turned to the opening position shown in FIG. 5.

In this opened state, the first barrier blades 5 and 6 and the second barrier blades 9 and 10 are turned to the position at which they recede from the barrier aperture 13a, i.e., out of the light entrance aperture when viewed from the optical axis direction as shown in FIG. 5. Also in the state shown in FIG. 5, since the barrier drive ring 2 is in the state of being biased clockwise (in the opening direction) by the opening springs 3 and 4, this opened state is maintained.

When the lens barrier is closed from the opened state shown in FIG. 5, the main switch 102 of the camera is turned off. The barrel drive mechanism (not shown) thereby causes the lens barrel 110 to collapse into the camera body 101. At this time, the barrel frame 1 moves closer to the cam barrel 14 rotating in a leftward direction as viewed in FIG. 2 (the counterclockwise direction as viewed in FIGS. 4 to 6, this direction of rotation as viewed in FIG. 2 being also expressed by "counterclockwise" in the following description).

In the course of this movement, the follower arm 2c of the barrier drive ring 2 is brought into contact with the sloping surface of the follower groove 14a of the cam barrel 14. With the further counterclockwise rotation of the cam barrel 14, the inner end surface of the follower groove 14a pushes the follower arm 2c to rotate the barrier drive ring 2 counterclockwise against the biasing forces of the opening springs 3 and 4.

As the barrier drive ring 2 rotates counterclockwise, the projection portions 5b and 6b are moved by the biasing forces of the closing springs 7 and 8 so as to follow the blade drive portions 2e and 2f. The first barrier blades 5 and 6 and the second barrier blades 9 and 10 are thereby turned to the closing position shown in FIG. 4.

Even after the barrier blades reached the position shown in FIG. 4, the barrier drive ring 2 is rotated counterclockwise by the rotation of the cam barrel 14. During this rotation, the closing springs 7 and 8 are charged and each barrier blade does not turn in the closing direction. Thus, the barrier closed state in the lens collapsed state is maintained.

Description will be made of the position of the barrier rail portions 2*d* provided on the barrier drive ring 2 in the barrier opened state and the barrier closed state with reference to FIGS. 7 to 9.

Figure 7:
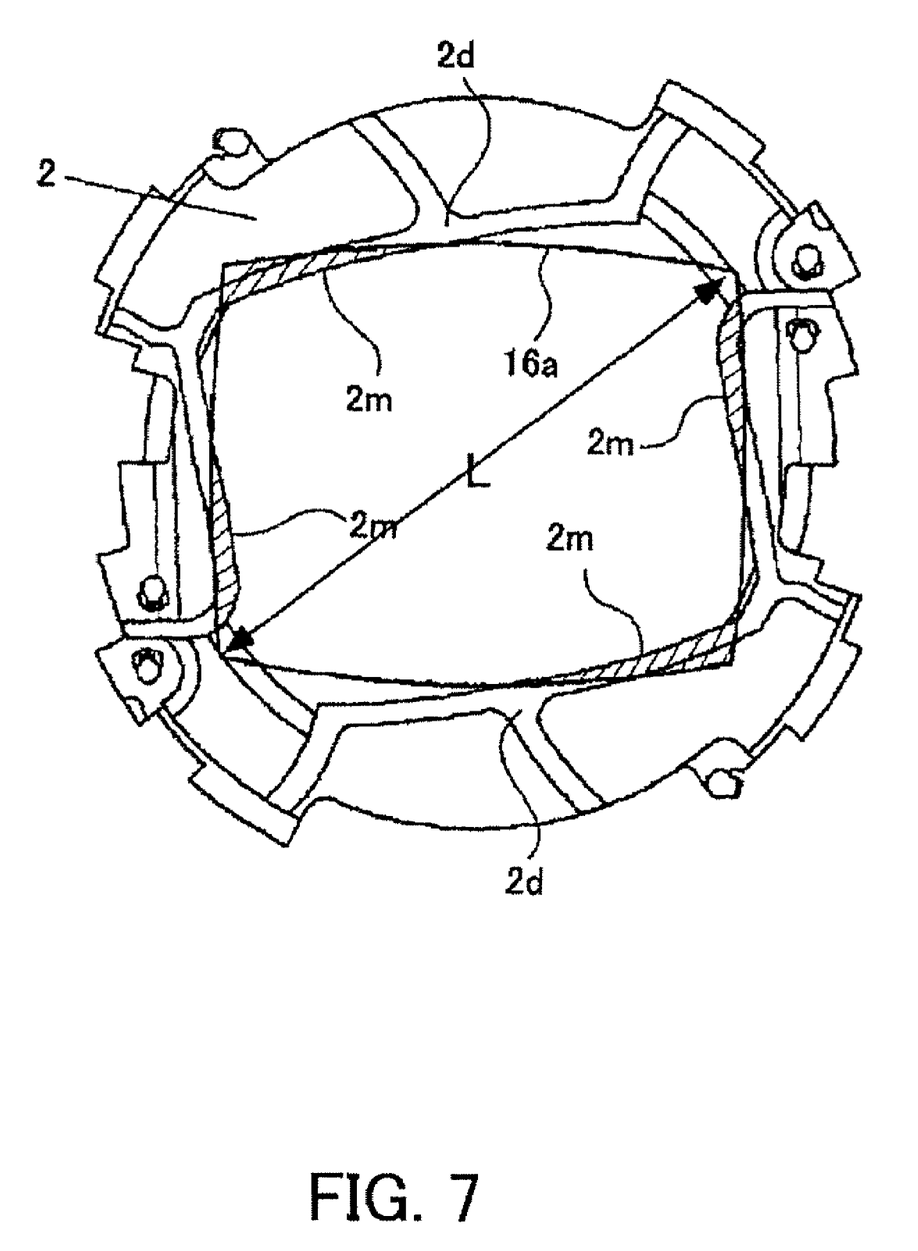
FIG. 7 is a sectional view showing the relationship between the effective light flux (light entrance aperture) taken along line A in FIG. 2 and the barrier drive ring.

FIG. 7 shows the barrier rail portions 2*d* in the barrier closed state in this embodiment. FIG. 7 is a sectional view taken along line A in FIG. 2. FIGS. 8 and 9 are diagrams for comparison with this embodiment.

In this embodiment, while the barrier rail portions 2*d* recede out of (or, are located outside) the light entrance aperture in the opened state shown in FIG. 5, parts 2*m* of the barrier rail portions 2*d* move into (or, are located inside) the light entrance aperture 16*a* in the closed state shown in FIG. 4, as shown in FIG. 7.

If the barrier rail portions move into the light entrance aperture in the barrier opened state, i.e., during image pickup with the camera, the effective light flux is partially blocked by the barrier rail portions. Such a condition should be avoided. Therefore, the shape of the barrier rail portions is needed to be set so that the barrier rail portions, that is, the diametrically-innermost portions of the barrier drive ring, do not move into the light entrance aperture in the barrier opened state.

Figure 8:
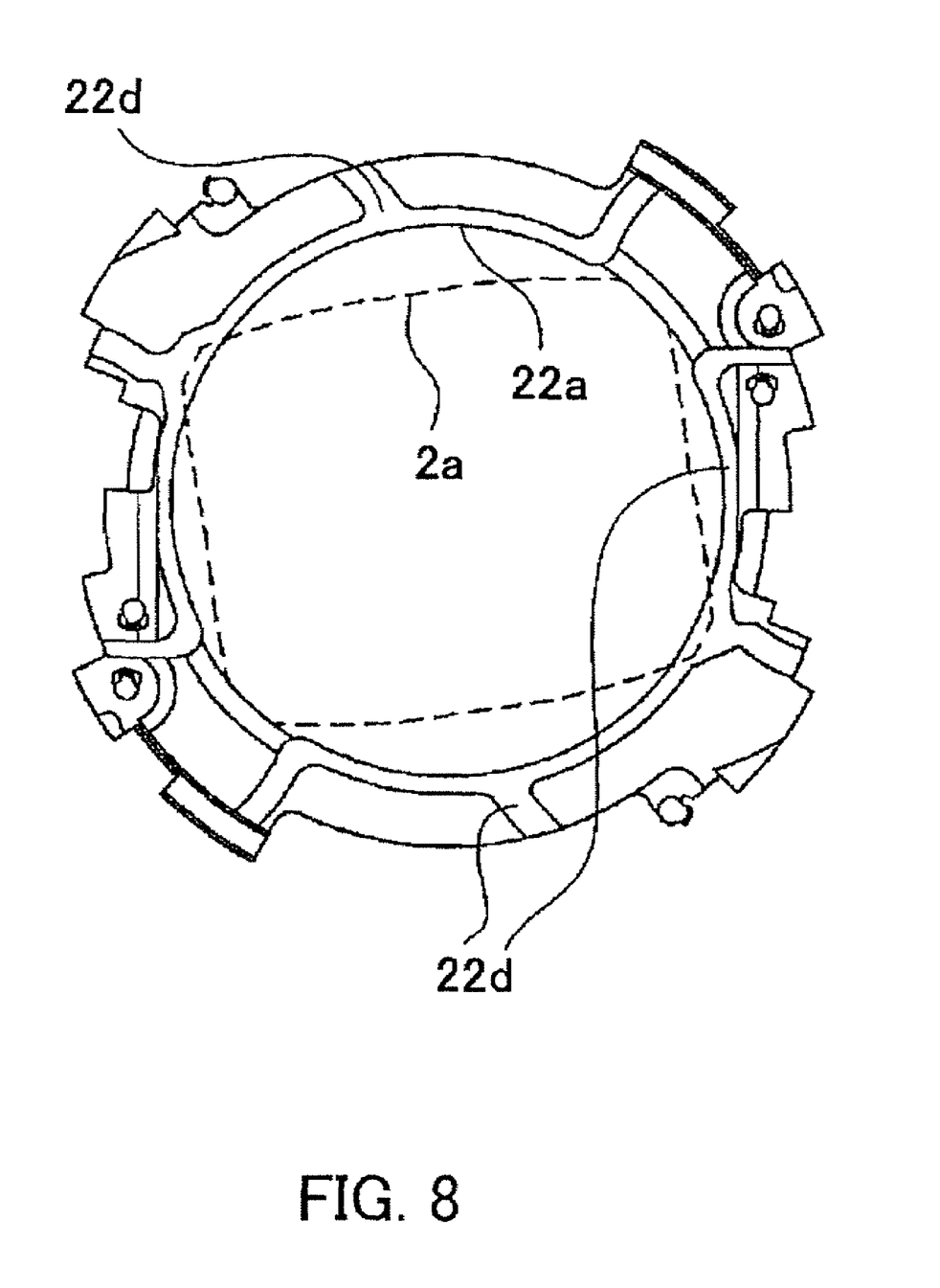
FIG. 8 is a front view of the shape of a barrier drive ring shown as a comparative example.

If a design is made such that the barrier rail portions do not move into the light entrance aperture regardless of the rotational position of the barrier drive ring, the barrier drive ring should have an opening portion 22*a* whose inside diameter of is equal to or larger than the diagonal length L (shown in FIG. 7) of the light entrance aperture as shown in FIG. 8, since the barrier drive ring rotates about the optical axis position. The broken line in FIG. 8 indicates the opening portion 2*a* of the barrier drive ring 2 in this embodiment.

That is, the barrier rail portions provided on the barrier drive ring are also provided outside this opening portion. If the above-described first barrier blades 5 and 6 and second barrier blades 9 and 10 are placed on the barrier drive ring shown in FIG. 8, the arrangement in the barrier closed state is as shown in FIG. 9.

Figure 9:
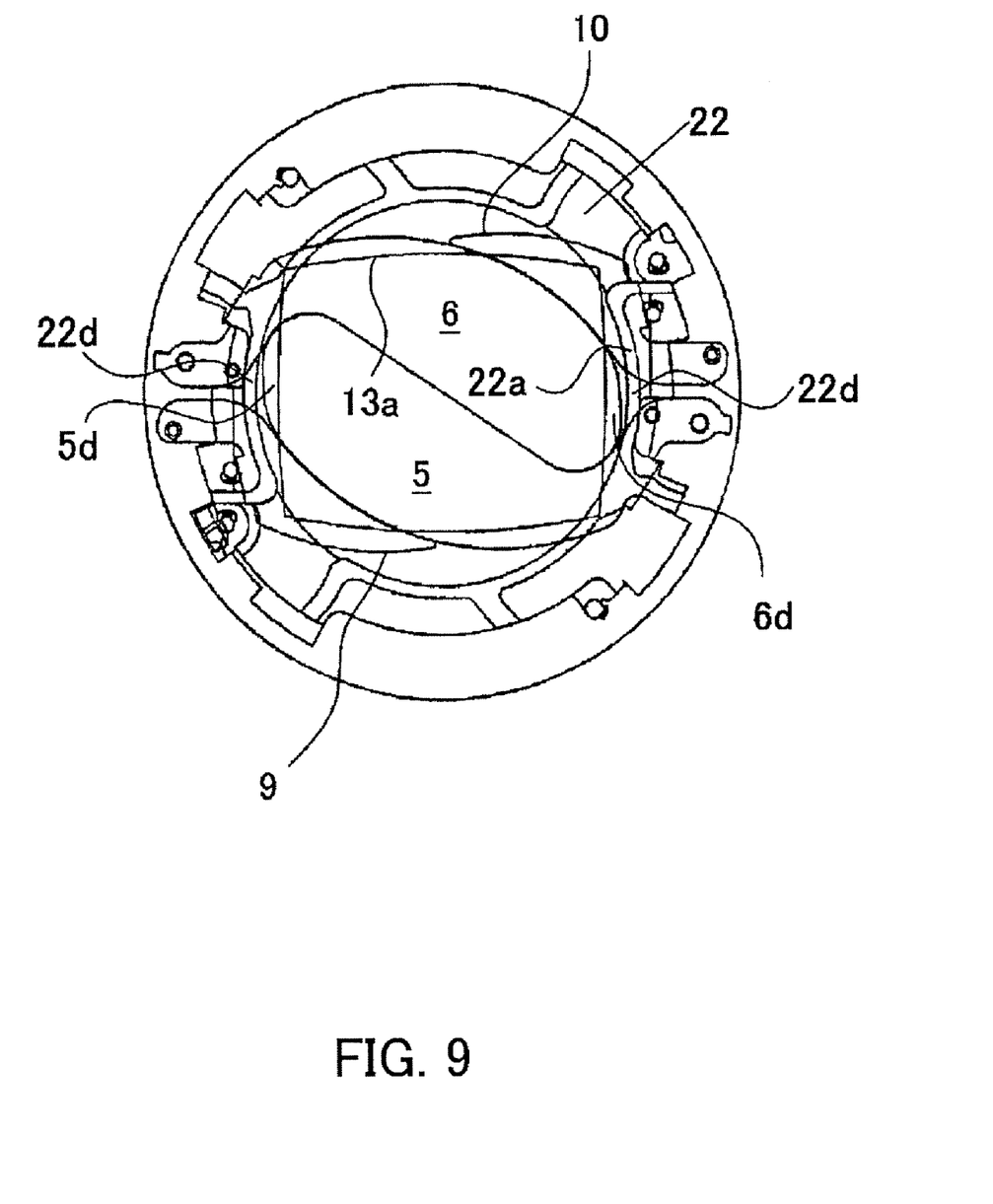
FIG. 9 is a front view of a lens barrier (closed state) using the barrier drive ring shown in FIG. 8.

Referring to FIG. 9, extreme end portions 5*d* and 6*d* remotest from the shaft portions 5*a* and 6*a* of the first barrier blades 5 and 6 (that is, portions opposite from the shaft portions 5*a* and 6*a*) are away from the barrier rail portions 22*d* of the barrier drive ring. That is, no supporting portions exist, as portions limiting the movement of the first barrier blades 5 and 6 toward the image side, at the extreme end portions remotest from the portions held as the centers of turn in the first barrier blades 5 and 6.

In this situation, when an external force is applied to the first barrier blade 5 or 6 from the object side, a deformation or the like is caused in the first barrier blade 5 or 6 such that the first barrier blade 5 or 6 moves toward the lens surface on the image side to scratch the lens surface or make the lens barrier unable to operate.

In this embodiment, however, the barrier rail portions 2*d* (2*m*) have such a shape as to move into the area inside the light entrance aperture in the barrier closed state when image pickup is not performed, as shown in FIG. 7. Therefore, even if an external force is applied to the first barrier blade 5 or 6 through the barrier aperture 13*a*, the external force is received by the barrier rail portion 2*d* (2*m*). Thus, the movement due to a deformation or the like of the first barrier blades 5 and 6 is limited.

In the barrier drive ring having the shape shown in FIG. 8, prevention of the movement of the first barrier blades 5 and 6 toward the image side in the closed state requires increasing the size of the extreme end portions thereof in the lengthwise direction so that the extreme end portions are not away from the barrier rail portions 22*d*. If the barrier blades are increased in size, a need necessarily arises to enlarge the retraction space in the lens barrel when the blades recede out of the barrier aperture.

Moreover, if the extreme end portions of the first barrier blades 5 and 6 are extended in the lengthwise direction, it is necessary that the inner peripheral portions of the second barrier blades 9 and 10 interlocked with the first barrier blades 5 and 6 exist on an outer position in comparison with that in this embodiment. That is, it is necessary that the second barrier blades themselves be placed in the outer position. Consequently, an increase in the outside diameter of the lens barrel, which is an impediment to the reduction in size of the lens barrel, cannot be avoided.

An arrangement is also conceivable in which a fixed base plate having an opening portion and barrier rail portions of such sizes as not to block the effective light flux is inserted at a position adjacent to the barrier blades on the image side, which is a member separate from the barrier drive ring for the purpose of preventing the barrier blades from moving toward the image side. This arrangement, however, increases the number of component parts and does not contribute to a reduction in size of the lens barrel. It also leads to an increase in manufacturing cost.

In this embodiment, from consideration of the above, the barrier rail portions 2*d* provided on the barrier drive ring 2 are formed into such a shape as to recede out of the light entrance aperture in the barrier opened state and to move into the light entrance aperture in the barrier closed state. In this way, a lens barrier strong against external force can be realized while avoiding increasing the number of component parts and while reducing the outside diameter of the lens barrel.

The lens barrier according to this embodiment also has features described below. In this embodiment, the portion 202*a* and 203*a* in the barrier blades 202 and 203 projecting beyond the outer peripheral end of the lens barrel 201 in the conventional arrangement shown in FIGS. 11 and 12 are separately formed as the second barrier blades 9 and 10. This configuration contributes to a reduction in outside diameter of the lens barrel.

Further, the four barrier blades, i.e., the first barrier blades 5 and 6 and the second barrier blades 9 and 10 are arranged in a lens barrel diametrical direction (a direction in the barrier opening/closing plane) without being made retractable by being overlapped with each other as disclosed in Japanese Utility Model Laid-Open No. 3-18519. The thickness of the entire lens barrier mechanism (the length in the optical axis direction) can be reduced in this way.

Further, in this embodiment, the first barrier blades 5 and 6 are biased in the closing direction by the charged forces of the closing springs 7 and 8 in the barrier closed state, thereby enabling the barrier blades to be again closed by the charged forces of the closing springs 7 and 8 even when a camera user or the like intentionally performs an operation to open the barrier blades while the camera is in the barrier closed state (the state in which the main switch of the camera is off).

In an arrangement in which the first barrier blades are driven by a component part such as a cam, there is a risk of the component part being broken when the barrier blades are intentionally moved. In this embodiment, however, only charging of the closing springs 7 and 8 is performed in such a case and there is no risk of breakage.

According to the embodiment, when an external force toward the image side is applied to the barrier blade in the closed state, it is supported by the supporting portion located inside the light entrance aperture to limit its movement. Therefore, an external force applied to the barrier blade through the light entrance aperture can be received by the supporting portion with reliability. Thus, the resistance of the barrier blade to the external force can be increased without increasing the strength of the barrier blade itself, and the movement of the barrier blade toward the image side (the lens surface side) is limited in comparison with the conventional art even when a large external force is applied.

While the embodiment has been described with respect to the compact digital still camera, it can be applied to various image pickup apparatuses such as single lens reflex cameras and video cameras.

Furthermore, the present invention is not limited to these preferred embodiments and various variations and modifications may be made without departing from the scope of the present invention.

This application claims foreign priority benefits based on Japanese Patent Application No. 2006-041187, filed on Feb. 17, 2006, which is hereby incorporated by reference herein in its entirety as if fully set forth herein.

What is claimed is:

1. An image pickup apparatus comprising:
    a barrier blade which is movable between a closing position at which the barrier blade closes a light entrance aperture of an image pickup lens and an opening position at which the barrier blade opens the light entrance aperture;
    a drive member which drives the barrier blade either to the closing position or to the opening position by rotating around an optical axis of the image pickup lens; and
    a barrier supporting portion provided in the drive member configured to guide the barrier blade either to the closing position or to the opening position,
    wherein the barrier supporting portion is designed to be located outside the light entrance aperture of the image pickup lens when the barrier supporting portion guides the barrier blade to the opening position and located inside the light entrance aperture of the image pickup lens when the barrier supporting portion guides the barrier blade to the closing position thereby limiting the movement of the barrier blade toward a lens surface side of the image pickup apparatus when the barrier blade is in the closing position.

2. The image pickup apparatus according to claim 1, wherein the barrier blade is turned between the closing position and the opening position, and
    the barrier supporting portion contacts an image side surface of the barrier blade at part of the barrier blade opposite from the center of turn when the barrier blade is at the closing position.

3. The image pickup apparatus according to claim 1, wherein the apparatus includes a first barrier blade which closes and opens a first region of the light entrance aperture and a second barrier blade which closes and opens a second region of the light entrance aperture, the first region including the position of an optical axis of the image pickup lens and the second region being outside of the first region, and
    the barrier supporting portion contacts an image side surface of the first barrier blade when the first barrier blade is at the closing position.

4. The image pickup apparatus according to claim 1, wherein the barrier supporting portion limits the movement of the barrier blade exceeding a predetermined amount.

5. The image pickup apparatus according to claim 4, wherein the predetermined amount corresponds to a gap provided between the barrier supporting portion and the barrier blade to enable the barrier blade to turn.

* * * * *